United States Patent [19]
Hill

[11] Patent Number: 5,862,164
[45] Date of Patent: Jan. 19, 1999

[54] APPARATUS TO TRANSFORM WITH HIGH EFFICIENCY A SINGLE FREQUENCY, LINEARLY POLARIZED LASER BEAM INTO BEAMS WITH TWO ORTHOGONALLY POLARIZED FREQUENCY COMPONENTS ORTHOGONALLY POLARIZED

[75] Inventor: Henry Allen Hill, Tucson, Ariz.

[73] Assignee: Zygo Corporation, Middlefield, Conn.

[21] Appl. No.: 686,536

[22] Filed: Jul. 26, 1996

[51] Int. Cl.$^6$ ........................................................... H01S 3/10
[52] U.S. Cl. ............................. 372/27; 372/12; 372/13; 372/22; 372/31; 372/32; 372/93
[58] Field of Search ................................. 372/27, 12, 13, 372/22, 31, 32, 100, 92, 93, 106; 352/328

[56] References Cited

U.S. PATENT DOCUMENTS

| | | |
|---|---|---|
| 3,458,259 | 7/1969 | Bagley et al. . |
| 3,656,853 | 4/1972 | Bagley et al. . |
| 3,662,279 | 5/1972 | Sandstrom et al. . |
| 3,665,204 | 5/1972 | Nelson ..................................... 359/328 |
| 3,889,207 | 6/1975 | Burgwald et al. . |
| 4,216,440 | 8/1980 | Rahn et al. ............................. 372/100 |
| 4,684,828 | 8/1987 | Sommargren . |
| 4,687,958 | 8/1987 | Sommargren . |
| 4,907,241 | 3/1990 | Karube .................................... 372/93 |
| 5,485,272 | 1/1996 | Dirksen et al. . |

OTHER PUBLICATIONS

J.B. Ferguson, et al., "Single–Mode Collapse In 6328–A He–Ne Lasers", pp. 2924–2929 (Applied Optics, vol. 17, No. 18, Sep. 1978).

T. Baer, et al., "Frequency Stabilizer Of A 0.633–Um He–Ne Longitudual Zeeman Laser", pp. 3173–3177 (Applied Optics, vol. 19, No. 18, Sep. 1980).

T. Okoshi et al., "Frequency Stabilisation Of Semiconductor Laser For Heterodyne–Type Optical Communication Systems", pp. 179–181 (Electronic Letters, vol. 16, No. 5, Feb. 1980).

S. Yamaguchi et al., "Simultaneous Stabilization Of The Frequency And Power Of An AlGaAs Semiconductor Laser By Use Of The Optogalvanic Effect of Krypton", pp. 1514–1519 (IEEE Journal of Quantum Electronics, vol. QE–19, No. 10, Oct. 1983).

R.W. Dixon, "Acoustic Diffraction Of Light In Anisotropic Media", pp. 85–93 (IEEE Journal of Quantum Electronics, vol. QE–3, No. 2, Feb. 1967).

G. Bouwhuis, "Interferometrie Met Gaslasers", pp. 225–232 (Ned T. Natuurk, vol. 34, Aug. 1968) and translated Abstract.

N. Bobroff, "Recent Advances In Displacement Measuring Interferometry", pp. 907–926 (Measurement Science & Technology, vol. 4, No. 9, Sep. 1993).

H. Matsumoto, "Recent Interferometric Measurements Using Stabilized Lasers", pp. 87–94 (Precision Engineering, 1984).

Y. Ohtsuka, et al., "Two–Frequency Laser Interferometer For Small Displacement Measurements In A Low Frequency Range", pp. 219–224 (Applied Optics, vol. 18, No. 2, Jan. 1979).

(List continued on next page.)

*Primary Examiner*—Leon Scott, Jr.
*Attorney, Agent, or Firm*—Lawrence G. Kurland; Bryan Cave LLP

[57] ABSTRACT

An electro-optical apparatus transforms a single frequency, linearly polarized laser input beam (18) from a light source (10) into an output beam (36) having two collinear orthogonally polarized output beam components (32,33) differing in frequency from each other by the frequency of a stabilized electrical signal (40) provided from an electronic oscillator (38). The output of the oscillator (38) is provided to a power amplifier (42) which is used to drive a piezoelectric transducer (46) affixed to an acousto-optical Bragg cell (52) through which the input beam (18) passes and is transformed into the output beam (36) composed of two beam components (32,33). The electrical output (44) of the power amplifier (42) is adjusted so that each of the output beam components (32,33) has approximately a preselected fraction of the intensity of the input beam (18).

33 Claims, 8 Drawing Sheets

OTHER PUBLICATIONS

N.A. Massie, et al., "*Measuring Laser Flow Fields With A 64–Channel Heterodyne Interferometer*", pp. 2141–2151 (Applied Optics, vol. 22, No. 14, Jul. 15, 1983).

Y. Ohtsuka, et al., "*Dynamic Two–Frequency Interferometry For Small Displacement Measurements*", pp. 25–29 (Optics and Laser Technology, Feb. 1984).

N.A. Riza, et al., "*Acousto–Optic System For The Generation And Control Of Tunable Low–Frequency Signals*", pp. 920–925 (Optical Engineering, vol. 35, No. 4, Apr. 1996).

APPARATUS TO TRANSFORM WITH HIGH EFFICIENCY A SINGLE FREQUENCY, LINEARLY POLARIZED LASER BEAM INTO BEAMS WITH TWO ORTHOGONALLY POLARIZED FREQUENCY COMPONENTS ORTHOGONALLY POLARIZED

BACKGROUND OF THE INVENTION

1. Field of the Invention

The present invention relates to apparatus for transforming with high diffraction efficiency a single frequency, linearly polarized laser beam into a beam with two frequency components that are collinear and orthogonally polarized. More particularly, the invention relates to electro-optical apparatus that are useful in a variety of optical measuring devices that perform extremely accurate measurement of changes in either length or optical length.

2. The Prior Art

The use of optical interferometry to measure changes in either length, distance, or optical length has grown significantly due not only to technological advances in lasers, photosensors, and microelectronics but also to an ever increasing demand for high precision, high accuracy measurements (cf. N. Bobroff, "Recent advances in displacement measuring interferometry," *Meas. Sci. Technol.* Vol. 4, pp. 907–926 (September 1993)). The prior art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies. In the prior art two-optical frequency heterodyne interferometers, the two optical frequencies are produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, Vol. 34, pp. 225–232 (August 1968); Bagley et al., U.S. Pat. No. 3,656,853, issued Apr. 18, 1972; and H. Matsumoto, "Recent interferometric measurements using stabilized lasers," *Precision Engineering*, Vol. 6, pp. 87–94 (1984); (2) use of a pair of acousto-optic Bragg cells, see for example, Y. Ohtsuka and K. Itoh, "Two-frequency Laser Interferometer for Small Displacement Measurements in a Low Frequency Range," *Applied Optics*, Vol. 18, pp. 219–224 (1979); N. Massie et al., "Measuring Laser Flow Fields With a 64-Channel Heterodyne Interferometer," *Applied Optics*, Vol. 22, pp. 2141–2151 (1983); Y. Ohtsuka and M. Tsubokawa, "Dynamic Two-frequency Interferometry for Small Displacement Measurements," *Optics and Laser Technology*, Vol. 16, pp. 25–29 (1984); H. Matsumoto, op. cit.; P. Dirksen, et al., U.S. Pat. No. 5,485,272, issued Jan. 16, 1996; N. A. Riza and M. M. K. Howlader, "Acousto-optic system for the generation and control of tunable low-frequency signals," Opt. Eng., Vol. 35, pp. 920–025 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., op. cit.; or (4) use of two longitudinal modes of a randomly polarized HeNe laser, see for example, J. B. Ferguson and R. H. Morris, "Single Mode Collapse in 6328 Å HeNe Lasers," *Applied Optics*, Vol. 17, pp. 2924–2929 (1978).

As for the prior art use of a Zeeman split laser to produce the two optical frequencies, this approach is only applicable to certain lasers (e.g., HeNe) and limits the frequency difference between the two optical frequencies to about 2 MHz. This imposes a limit on the maximum rate of change of the length or optical length being measured. In addition, the available power from a Zeeman spilt laser is less than 500 microwatts which can be a serious limitation when one laser source must be used for the measurement of multiple axes, such as three to six axes.

As for the prior art use of a single Bragg cell in the commonly owned Sommargren, U.S. Pat. No. 4,687,958, the diffraction efficiency may be low because the optic axis of the uniaxial crystal, the direction of the input optical beam, and the direction of the acoustic beam, are approximately collinear and under these conditions, a small change in the direction of the input beam such as caused by diffraction, will result in an unacceptable momentum mismatch. Also in commonly owned Sommargren, U.S. Pat. No. 4,687,958, the diffraction efficiency may be low for a number of different types of uniaxial crystals because the efficiency of the dominant Bragg diffraction mode in this group of uniaxial crystals is proportional to the sine of the angle between the optic axis of the uniaxial crystal and either one or the other of the directions of the optical beam components or the direction of the acoustic beam. To compensate for the possibility of low diffraction efficiency resulting from the latter of these two reasons, the path length in the Bragg cell may be increased. However, this procedure may lead to a Bragg cell that is inordinately long which in turn can result in an expensive apparatus. Also an extended length may lead to a diffracted beam with width elongated in the plane of diffraction and an increased lateral separation also in the diffraction plane between orthogonally polarized beam components. These two potential low diffraction efficiency problems are not encountered in the present invention because the optic axis of the uniaxial crystal and the direction of the acoustic beam are approximately orthogonal. In addition, if the uniaxial crystal in the Bragg cell of commonly owned U.S. Pat. No. 4,687,958 is optically active (e.g., quartz), there may be an accompanying reduction in the diffraction efficiency which subsequently requires a further increase in the required path length for what is already an expensive apparatus. The angle between the optic axis and the acoustic beam can be increased in commonly owned Sommargren, U.S. Pat. No. 4,687,958 in order to achieve a reduction of the momentum mismatch problem and of the required path length. However, this angle can preferably only be increased by approximately 27 degrees because for larger angles, the orthogonally polarized beam components may suffer total internal reflection at the nominal exit face of the Bragg cell and the device would cease to function.

As for the prior art use of a single Bragg cell in commonly owned Sommargren, U.S. Pat. No. 4,684,828, the apparatus has many parts which are separated and require more space, is sensitive to misalignment of the various parts, is more sensitive to thermal gradients in the apparatus as a result of multiple parts and the required separation of multiple parts, and is not as efficient as the present invention, i.e., approximately 50% of the input beam intensity is transformed into the output beam with the commonly owned Sommargren, U.S. Pat. No. 4,684,828 as compared to nominally 100% with the apparatus described herein.

As for the prior art use of a single Bragg cell in Dirksen, et al., op. cit., the frequency difference between the two orthogonally polarized components of the exit beam is twice the frequency of the acoustic beam. Starting with a higher frequency difference, the task of resolution extension becomes more difficult and expensive. Also with the single Bragg cell in Dirksen, et al., op. cit., the efficiency is limited to approximately 80% and there are significant non uniform intensity distributions across the two orthogonally polarized exit beam components in contrast to the present invention described herein. These non uniform intensity distributions across the width of the two orthogonally polarized exit beam components have a negative cross-correlation coefficient which further exacerbates the effect of non uniform beam component intensities for interferometry. There is generally polarization mixing in both of the two exit beam components since Dirksen et al., op. cit. uses normal Bragg diffraction mode which limits its utility in precision interferometric measurements. The apparatus of Dirksen et al., op. cit. is more complex requiring a minimum of two optical elements in addition to the Bragg cell and generates two desired and two undesired beam components which must be separated by external masks to occult the undesired beam components. There is more sensitivity to changes in temperature and temperature gradients because of multiple elements comprised of different materials and because of the larger angles between the components of the beams inside Dirksen et al., op. cit., apparatus in contrast to that found in the apparatus of the present invention described herein. The angles between the components of the beams inside Dirksen et al. op. cit. apparatus are generally larger by design because Dirksen et al., op. cit., must spatially separate the desired and undesired beam components as a result of using normal Bragg diffraction in contrast to the present invention described herein which uses anisotropic Bragg diffraction. The Dirksen et al., op. cit., apparatus, which requires separation of parts, is sensitive to misalignment with additional sensitivity to thermal gradients. In addition, since the acoustic frequency for a single Bragg cell apparatus in Dirksen et al., op. cit., is one half of the frequency difference between the two orthogonally polarized components of the exit beam, the apparatus in Dirksen et al., op. cit. must operate at a lower acoustical frequency by a factor of two than in the apparatus of the present invention described herein to obtain a given frequency difference between the two orthogonally polarized components of the exit beam which leads to an additional reduction in efficiency.

As for the prior art use of two Bragg cells in Dirksen et al., op. cit., the apparatus has more parts than the single Bragg cell apparatus described in Dirksen et al., op. cit., which are well separated and require more space, there is generally polarization mixing in each of two exit beam components since the Dirksen et al., op. cit., uses normal Bragg diffraction mode, is sensitive to misalignment of the various parts, is more sensitive to thermal gradients in the apparatus as a result of multiple parts and the required separation of multiple parts, is not as efficient as the apparatus of the present invention described herein, i.e., approximately 60% to 80% of the input beam intensity is transformed into the output beam with the Dirksen et al., op. cit., as compared to nominally 100% with the apparatus described herein, generates two desired and either two or six undesired exit beam components depending on apparatus configuration selected, increased non uniform intensity distributions across two orthogonally polarized exit beam components, non uniform intensity distributions across widths of two orthogonally polarized exit beam components have negative cross-correlation coefficient which further exacerbates the effect of non uniform beam component intensities, and external masks are required to occult undesired beam components.

Finally, although the prior art use of two longitudinal modes of a randomly polarized HeNe laser provides a laser beam with two orthogonally polarized frequencies in a rather convenient, cost-effective form, the frequency difference is approximately 500–600 MHz which requires complicated, expensive detection and processing electronics. Furthermore, by starting out with such a high frequency difference, the task of resolution extension becomes difficult and expensive.

Some of the principal advantages of the present invention are that the apparatus: is comprised of a single crystal with piezoelectric transducer bonded directly to the crystal, has high diffraction efficiency, has compact size requiring no external beam stops, has an efficiency of nominally 100% for conversion of input intensity into intensities of two orthogonally polarized exit beam components, and the intensity of each of two orthogonally polarized exit beam components may be adjusted to nominally 50% of the input intensity. In addition, the apparatus of the present invention can generate in a single Bragg diffraction two orthogonally polarized exit beam components with a frequency difference well below the critical acoustical frequency of the Bragg cell. The appartus of the present invention also exhibits reduced polarization mixing, has more uniform intensity distributions across two orthogonally polarized exit beam components, has reduced lateral displacement between orthogonally polarized exit beam components because of anisotropic Bragg diffraction used in the present invention, and has lateral displacement between the orthogonally polarized exit beam components not effected by misalignment of multiple elements. Furthermore, the apparatus of the present invention has reduced angular displacement between orthogonally polarized beam components inside the Bragg cell which is made possible by the use of anisotropic Bragg diffraction in the present invention, and the angular displacement between orthogonally polarized exit beam components has reduced sensitivity to changes in temperature or to temperature gradients of the apparatus in part because of reduced angular displacement between orthogonally polarized beam components inside the Bragg cell. The angular displacement between input and exit beam in the apparatus of the present invention has reduced sensitivity to changes in temperature or to temperature gradients of apparatus, and, futhermore, there are not multiple elements to create misalignment of directions of the input and exit beam.

Consequently, while prior art techniques for producing a laser beam with two optical frequencies of orthogonal polarization are useful for some applications, none known to applicant provide the technical performance in a commercially viable form for applications requiring the measurement of rapidly changing lengths (distances) to extremely high resolution. The aforementioned disadvantages of the prior art are overcome by the present invention.

SUMMARY OF THE INVENTION

In accordance with one embodiment of the present invention, I provide an electro-optical apparatus capable of transforming a single frequency linearly polarized laser beam into a beam with two collinear orthogonally polarized components with different frequencies comprising a source of a single frequency, linearly polarized first external input beam, most preferably a laser; a source of an electrical signal of frequency $f_o$, most preferably a frequency stabilized electronic oscillator; and an amplifier, most preferably an electronic amplifier, for delivering this electrical signal to an apparatus, most preferably an acousto-optical device comprised of a piezoelectric transducer bonded to a uniaxial crystal, which transforms this electrical signal into an acoustic beam, most preferably an acoustic shear wave, in the interior of the said acousto-optical device. The apparatus further comprises means, most preferably acoustic absorbing material affixed to the uniaxial crystal; means, most preferably a first anti-reflecting surface affixed to the acousto-optical device, to transmit the first external input beam into the interior of the uniaxial crystal as a first internal input beam, the first internal input beam being ordinarily polarized; and means, most preferably first optical reflection surface(s) affixed to the uniaxial crystal, to transform the said first internal input beam into a first intermediate beam with the first intermediate beam being ordinarily polarized, the direction of propagation of the first intermediate beam being nominally perpendicular to the direction of propagation of the acoustic beam in the region of the acoustic beam. Means, most preferably the photoelastic interaction, transforms the first intermediate beam during a single pass through the region of the acoustic beam into second and third intermediate beams, the second intermediate beam having a direction of propagation, frequency, and polarization which is the same as that of the first intermediate beam, the third intermediate beam being extraordinarily polarized, the second and third intermediate beams having a frequency difference $f_0$ and a small difference in direction of propagation. Means, most preferably second optical reflecting surface(s) and a second anti-reflecting surface affixed to the uniaxial crystal cause the the second and third intermediate beams to exit the apparatus as first and second exit beams having the same direction of propagation, orthogonal polarizations, a small relative displacement, and a difference in frequency $f_0$, with the first exit beam having the same polarization and frequency as the second intermediate beam which is the same as the first external input beam, the second exit beam having the same polarization and frequency as the third intermediate beam, the sum of the intensities of the first and second exit beams being nominally the same as the intensity of the first external input beam, and the intensity of the first exit beam relative to the intensity of said first external input beam being adjustable between nominal values of 0% to 100%.

In accordance with a second embodiment of the present invention, I provide an electro-optical apparatus capable of transforming a single frequency linearly polarized laser beam into a beam with two collinear orthogonally polarized components with different frequencies comprising the electro-optical apparatus of the previously described embodiment; means for rotating the polarization of the linearly polarized input beam to generate a second external input beam, the polarization being orthogonal to the polarization of the first external input beam of the previously described embodiment; means, most preferably the first anti-reflecting surface affixed to the acousto-optical device, to transmit the second external input beam into the interior of the uniaxial crystal as a second internal input beam, the second internal input beam being extraordinarily polarized; and means, most preferably the first optical reflection surface(s), to transform the second internal input beam into a fourth intermediate beam with the fourth intermediate beam being extraordinarily polarized, the direction of propagation of the fourth intermediate beam being nominally perpendicular to the direction of propagation of the acoustic beam in the region of the acoustic beam and parallel to the direction of the third intermediate beam. Means, most preferably the photoelastic interaction, transforms the fourth intermediate beam during a single pass through the region of the acoustic beam into fifth and sixth intermediate beams, the fifth intermediate beam having a direction of propagation, frequency, and polarization which is the same as that of the fourth intermediate beam, the sixth intermediate beam being orthogonally polarized to the fifth intermediate beam and having a direction of propagation and polarization which is the same as the second intermediate beam, the fifth and sixth intermediate beams having a frequency difference $f_0$ and a small difference in direction of propagation. Means, most preferably the said second optical reflecting surface(s) and said second anti-reflecting surface, cause the fifth and sixth intermediate beams to exit the apparatus as third and fourth exit beams, the third and fourth exit beams having the same direction of propagation and the same small relative displacement as the first and second exit beams, the third exit beam having the same polarization as the second exit beam, the fourth exit beam having the same polarization as the first exit beam, the third and fourth exit beams having a frequency difference $f_0$, the first and third exit beams having the same frequency, the second and fourth exit beams having a frequency difference $2f_0$, the sum of the intensities of the third and fourth exit beams being nominally the same as the intensity of the second external input beam, and the intensity of the third exit beam relative to the intensity of the second external input beam being adjustable between nominal values of 0% to 100%.

In accordance with a third embodiment of the present invention, I provide an electro-optical apparatus capable of transforming a single frequency linearly polarized laser beam into a beam with four collinear components and with different frequencies and or states of polarization which comprises the electro-optical apparatus of the previously described first and second embodiments; means for rotating the polarization of the said linearly polarized input beam to generate a third external input beam, the polarization being a combination of the polarizations of the first and second external input beams of the first and second embodiments; and means, most preferably the first anti-reflecting surface and the first optical reflection surface(s), to transform the third external input beam into the first and fourth intermediate beams. Means, most preferably the photoelastic interaction, transforms the first and fourth intermediate beams during a single pass through the region of the acoustic beam into the second, third, fifth, and sixth intermediate beams. Means, most preferably the second optical reflecting surface(s) and the second anti-reflecting surface, cause the second, third, fifth, and sixth intermediate beams to exit the apparatus as the first, second, third, and fourth exit beams, the first, second, third, and fourth exit beams having the same direction of propagation, the first and second exit beams having the same small relative displacement as the third and fourth exit beams, the third exit beam having the same polarization as the second exit beam, the fourth exit beam having the same polarization as the first exit beam, the first and second exit beams having a frequency difference $f_0$, the third and fourth exit beams having a frequency difference $f_0$, the first and third exit beams having the same frequency, the second and fourth exit beams having a frequency difference $2 f_0$, the sum of the intensities of the first, second, third, and fourth exit beams being nominally the same as the intensity of the third external input beam, the ratio of the intensity of the first exit beam to the intensity of the second exit beam being the same as the ratio of the intensity of the third exit beam to the intensity of the fourth exit beam, and the sum of the intensities of the first and third exit beams relative to the intensity of the third external input beam being adjustable between nominal values of 0% to 100%.

THE DRAWINGS

In the drawings,

FIG. 1 depicts in schematic form the presently preferred first and second embodiments of the present invention;

FIG. 2 depicts in schematic form the detailed propagation of the light beams through the acousto-optical Bragg cell shown in FIG. 1 configured for use in the presently preferred first and second embodiments of the present invention such that the angle between the input beam (18) and the output beam (36) is an angle specified by the design of the Bragg cell to be a value approximately equal to 90 degrees and independent of small changes in the orientation of the Bragg cell in the plane of FIG. 2 relative to the direction of the input beam (18);

FIG. 3 depicts in schematic form the detailed propagation of the light beams through acousto-optical Bragg cell shown in FIG. 1 configured for use in the presently preferred first and second embodiments of the present invention such that the angle between the input beam (18) and the output beam (36) is an angle specified by the design of the Bragg cell to be a value approximately equal to 180 degrees and independent of small changes in the orientation of the Bragg cell in the plane of FIG. 3 relative to the direction of the input beam (18);

FIG. 4 depicts in schematic form the detailed propagation of the light beams through the acousto-optical Bragg cell shown in FIG. 1 configured for use in the presently preferred first and second embodiments such that the angle between the input beam (18) and the output beam (36) is an angle specified by the design of the Bragg cell to be a value approximately equal to 360 degrees and independent of small changes in the orientation of the Bragg cell in the plane of FIG. 4 relative to the direction of the input beam (18);

DETAILED DESCRIPTION OF THE PREFERRED EMBODIMENTS

Figure 1:
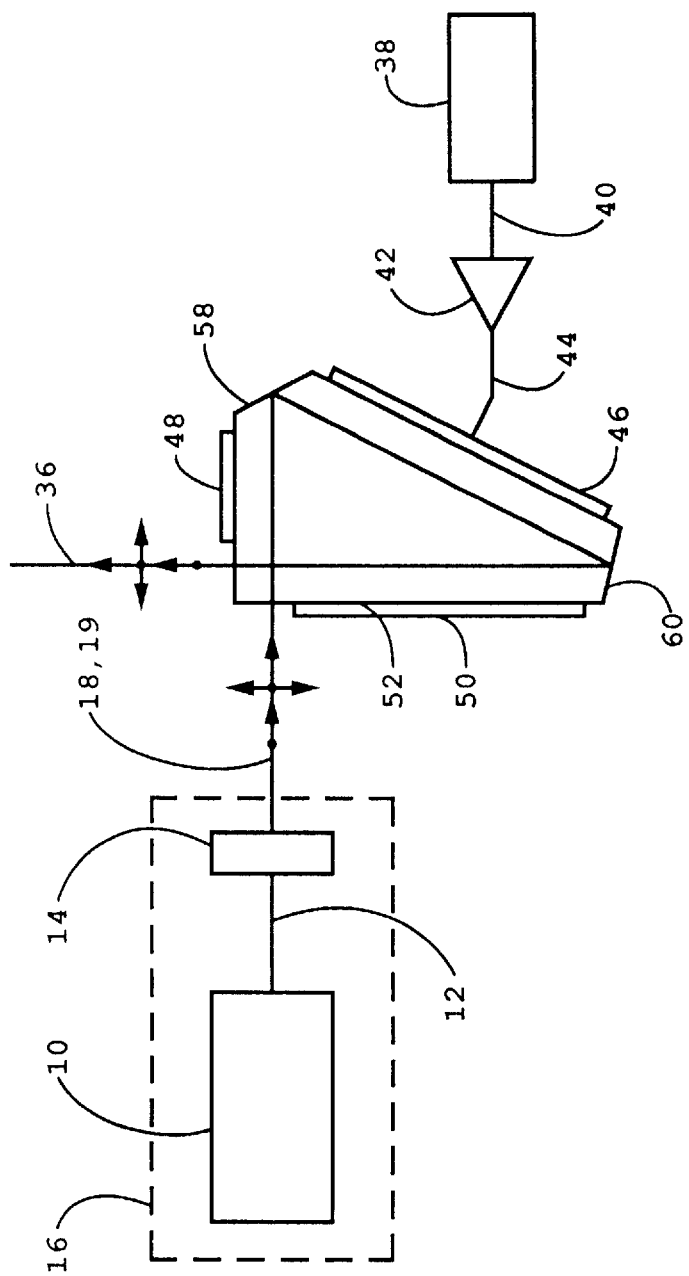

Referring to the drawings in detail, and initially to FIG. 1, FIG. 1 depicts, in schematic form, presently preferred first and second embodiments of the apparatus for the present invention. While the apparatus of the present invention has application for a wide range of radiation sources, the following description is taken, by way of example, with respect to an optical measuring system. The term "radiant energy" as used herein includes, but is not limited to, electromagnetic energy of all frequency ranges. A light source (10), such as most preferably a laser, provides a beam (12) of optical energy which has a single, stabilized frequency and is linearly polarized. Light source (10) can be any of a variety of lasers. For example, it can be a gas laser, e.g. a HeNe, stabilized in any of a variety of conventional techniques known to those skilled in the art to produce beam (12), see for example, T. Baer et al., "Frequency Stabilization of a 0.633 μm He—Ne-longitudinal Zeeman Laser," *Applied Optics*, Vol. 19, pp. 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, light source (10) can be a diode laser frequency stabilized in one of a variety of conventional techniques known to those skilled in the art to produce beam (12), see for example, T. Okoshi and K. Kikuchi, "Frequency Stabilization of Semiconductor Lasers for Heterodyne-type Optical Communication Systems," *Electronic Letters*, Vol. 16, pp. 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, Vol. QE-19, pp. 1514–1519 (1983). The specific device used for source (10) will determine the diameter and divergence of beam (12). For some sources, e.g. a diode laser, it is necessary to use conventional beam forming optics (14), e.g. a conventional microscope objective, to provide an input beam (18) with a suitable diameter and divergence for the elements that follow. When source (10) is a HeNe laser, for example, beam forming optics (14) may not be required. The elements (10) and (14) are shown in dashed box (16) which represents the source of the input beam (18). The input beam has one stabilized frequency $\theta_L$ and is linearly polarized perpendicular to the plane of FIG. 1. An electrical oscillator (38) preferably provides a frequency stabilized electrical signal (40) of frequency $f_0$ to a conventional power amplifier (42). The electrical output (44) of this power amplifier (42) is preferably used to drive a conventional piezoelectric transducer (46) affixed to an acousto-optical Bragg Cell (52). A piezoelectric transducer (46) is used to generate an acoustic beam which is preferably of the shear wave type. As is known to those skilled in the art of acousto-optical modulation, the shear wave may be conventionally generated with the piezoelectric transducer (46) affixed to an acousto-optical Bragg Cell (52) as shown in FIG. (2) or by reflecting an appropriately directed longitudinal acoustic wave from an appropriately oriented surface of the acousto-optical Bragg Cell (52). Conventional techniques known to those skilled in the art of acousto-optical modulation are used to absorb, by absorbers (48) and (50), the acoustic beam that passes through to the walls of the acousto-optical Bragg Cell (52).

Figure 2:
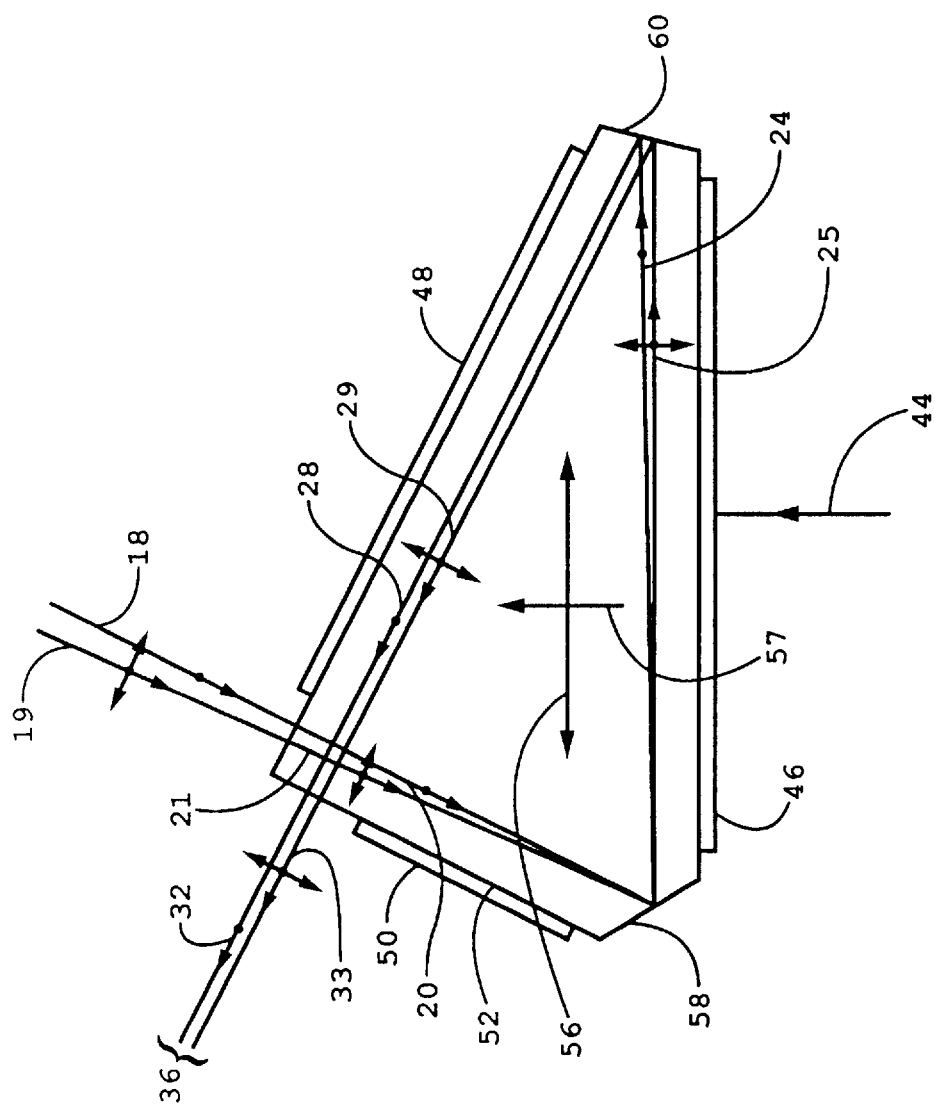
Figure 6:
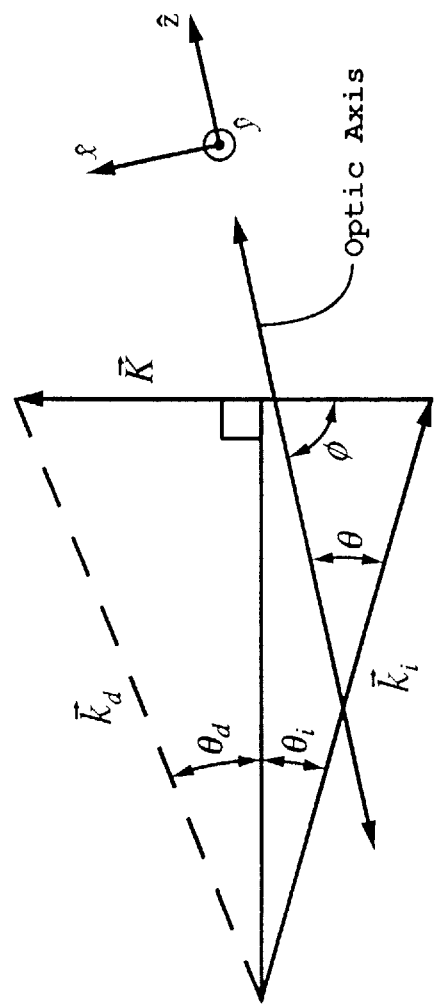
FIG. 6 depicts the optic axis of the uniaxial crystal and wavevector construction describing Bragg diffraction at a frequency $v_d = v_i + f_0$ in a positive uniaxial crystal for use in the present invention when the incident optical wave is extraordinarily polarized.

FIG. 2 depicts in schematic form the detailed propagation of the input beam (18) through the acousto-optical Bragg cell (52). The presently preferred acousto-optical Bragg cell (52) is made of a uniaxial crystal (e.g., LiNbO$_3$) having an optical axis (56) in the plane of FIG. 2 which makes an angle φ (FIG. 6) with the direction of propagation of the acoustic wave (57) generated by the piezoelectric transducer (46). The schematic illustrated in FIG. 2 is for a conventional Bragg cell (52) comprised of a negative uniaxial crystal. The input beam (18), such as illustrated in the first preferred embodiment, preferably enters the acousto-optical Bragg cell (52), becoming an ordinarily polarized beam (20). This beam (20) is reflected from surface (58) becoming an ordinarily polarized beam (24) at an angle $\theta_i$ to the normal to the direction of propagation of the acoustic wave (57). Due to the photoelastic interaction of this beam (24) with the acoustic wave (57) (see for example, R. W. Dixon, "Acoustic Diffraction of Light in Anisotropic Media," *IEEE Journal of Quantum Electronics*, Vol. QE-3, pp. 85–93 (1967); A. Yariv and P. Yeh, *Optical Waves in Crystals* (Wiley, New York), Chap. 9,(1984)), an extraordinarily polarized beam (25) is generated by Bragg diffraction when the following relationships are satisfied.

$$\sin\theta_i = \frac{\lambda_0}{2n_i\upsilon}\left[f_0 + \frac{\upsilon^2}{f_0\lambda_0^2}(n_i^2 - n_d^2)\right],$$

$$\sin\theta_d = \frac{\lambda_0}{2n_d\upsilon}\left[f_0 - \frac{\upsilon^2}{f_0\lambda_0^2}(n_i^2 - n_d^2)\right]$$

where $n_i$ and $n_d$ are the indices of refraction for the incident and diffracted beams, respectively, $\lambda_0$ is the optical wavelength in vacuum, and v is the acoustic speed. The angles $\theta_i$ and $\theta_d$ are the angles between the incident and diffracted optical beams and the normal to the acoustic K-vector, respectively. The definitions of positive $\theta_i$ and $\theta_d$ are illustrated in FIG. 6.

The index of refraction n for the extraordinarily polarized beam is defined by the expression:

$$\frac{1}{n^2} = \frac{1}{n_0^2}\cos^2\theta + \frac{1}{n_e^2}\sin^2\theta$$

where the angle $\theta$ is the angle between the extraordinarily polarized beam (25) and the optical axis (56) of the crystal (52) in the Bragg cell, and $n_0$ and $n_e$ are ordinary and extraordinary indices of refraction of the Bragg cell crystal, respectively.

This extraordinarily polarized beam (25) propagates at a small angle to that of the ordinarily polarized beam (24). In addition, the frequency of this beam (25) is $f_L - f_0$ while the frequency of the ordinarily polarized beam (24) is $f_L$ and the polarization of the beam (25) is orthogonal to that of the ordinarily polarized beam (24). These two beams (24, 25) are reflected from the crystal face (60) as beams (28) and (29). The respective angles of incidence and reflection for these beams (24), (25), (28), and (29) at the crystal face (60) and the respective angles of incidence and refraction for the beams (28), (29), (32), and (33) at the crystal face (62) are chosen such that beams (32) and (33) are parallel and spatially displaced by a minute amount, only a small fraction of the beam diameter. For purposes of illustration, this displacement is shown greatly exaggerated in FIG. 2. These beams (32) and (33) exit the acousto-optical Bragg cell (52) with small angles of refraction at the exit face. Preferably, the electrical output (44) of the power amplifier (42) is adjusted so that intensity of exit beam (32) relative to the intensity of the input beam (18) is some preselected nominal value between 0% and 100%. The total intensity of beams (32) and (33) is approximately 100% of input beam (18). Consequently, the output beam (36) is then composed of the two beam components (32) and (33) which are collinear, orthogonally polarized, and differ in frequency by $f_0$, while transforming essentially 100% of the input beam (18) intensity into the output beam (36).

The efficiency of Bragg diffraction is reduced when a momentum matching condition is not maintained for a change in the angle of the incident beam (18). Using the equation defining $\sin\theta_d$, the ratio of the differential change in $\theta_d$ required to match a differential change in $\theta$ can be computed, noting that this equation is based in part on the momentum matching condition. The variation in $\theta$ within an optical beam may be present for a number of reasons but diffraction is the limiting source. The result for this ratio in the case of the diffracted beam being extraordinarily polarized is defined by the expression:

$$\frac{\partial\theta_d}{\partial\theta} = \sin\theta\cos\theta\left(-\tan\theta_d + \frac{n_d\upsilon}{f_0\lambda_0}\sec\theta_d\right)n_d^2\left(\frac{1}{n_o^2} - \frac{1}{n_e^2}\right).$$

Figure 7:
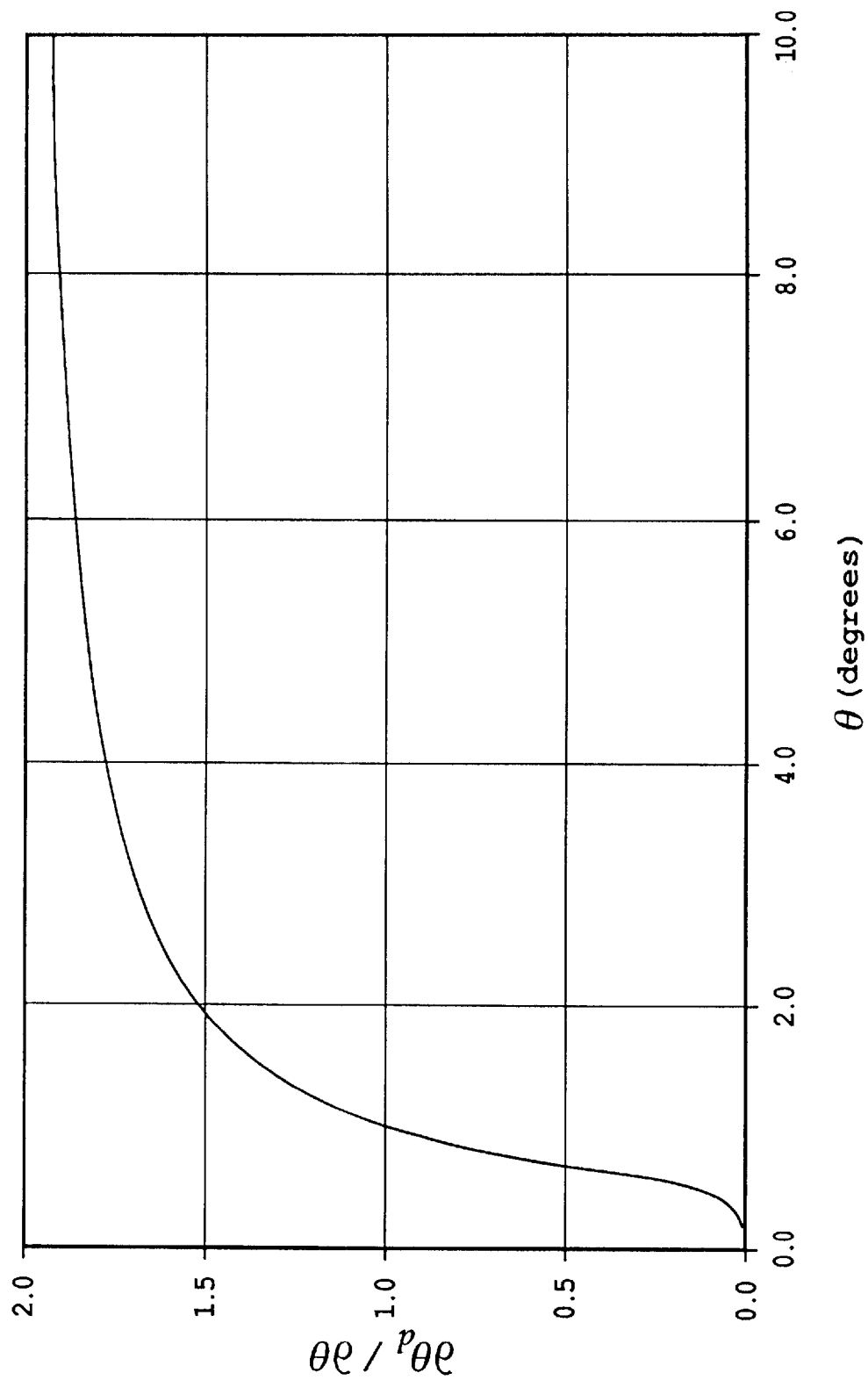
FIG. 7 is graph of partial derivative $\partial \theta_d / \partial \theta$ as a function of $\theta$ for the case of LiNbO$_3$ in the Bragg cell and $\theta_d + \theta = 0.5$deg for use in the present invention

This expression, which is a partial derivative, is graphically illustrated in FIG. 7 as a function of $\theta_d$ for the case of LiNbO$_3$ in the Bragg cell and $\theta_d + \theta = 0.5$deg. The quantity represented by the derivative $\partial\theta_d/\partial\theta$ may be discussed in terms of the ratio of the divergences of the acoustic and optical beams. The optimum performance with respect to diffraction efficiency is obtained when the partial derivative $\partial\theta_d/\partial\theta$ is near the value of 1. As is shown in FIG. 7, the optimum operating condition is available for the first described embodiment of the present invention, with the same property with respect to $\partial\theta_d/\partial\theta$ existing for the second and third described embodiments.

Figure 8:
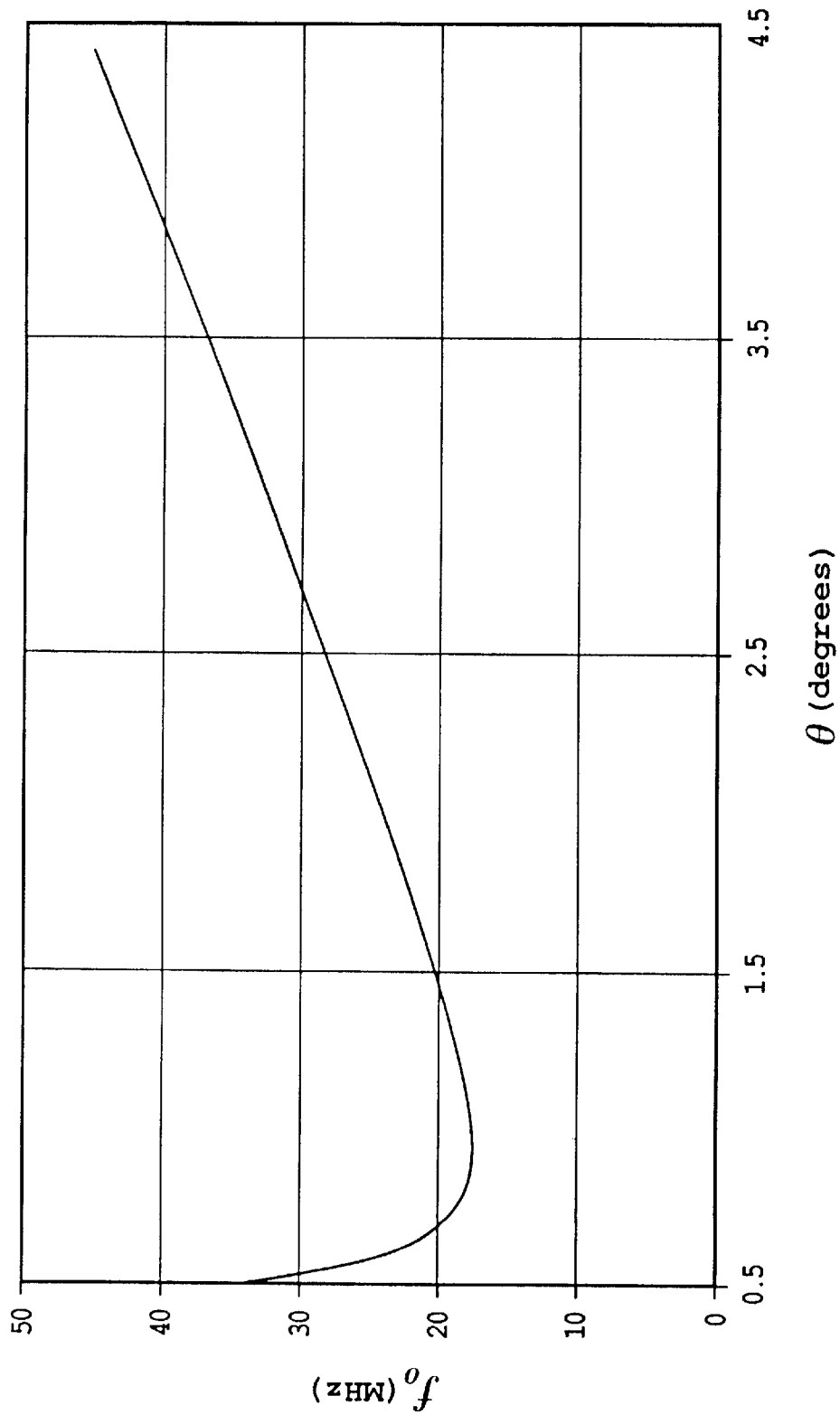
FIG. 8 is graph of $\theta_0$ as a function of $\theta$ for the case of LiNbO$_3$ in the Bragg cell and $\theta_d + \theta = 0.5$deg for use in the present invention.

It is possible to find conditions where partial derivative $\partial\theta_d/\partial\theta$ is exactly equal to 1 such as, for example, in the first embodiment of FIG. 2 when $\theta = -2\theta_d$ as is shown in FIG. 7. However, this is not a practical design because for $\partial\theta_d/\partial\theta = 1$, the partial derivative $\partial f_0/\partial\theta_d = 0$ which, in turn, means that any change at all in $f_0$ will lead to an unacceptable momentum mismatch. This problem is not present however when $\theta$ is not near the value of $-2\theta_d$ as shown in the graph of FIG. 8 with $\theta = 1.073$deg. FIGS. 7 and 8 taken together show that the optimum operating condition with respect to $\partial\theta_d/\partial\theta$ and a practical operating condition respect to $\partial f_0/\partial\theta_d$ is available for the first described embodiment. Again, preferably the same properties with respect to $\partial\theta_d/\partial\theta$ and $\partial f_0/\partial\theta_d$ exist for the second and third embodiments.

The momentum matching condition can preferably be used to calculate the difference between the direction of propagation of the incident and diffracted beams. The momentum matching condition for a Bragg process is defined by the equation $$n_d\cos\theta_d = n_i\cos\theta_i$$

In looking for the difference between the direction of propagation of the incident and diffracted beams for the present invention illustrated in FIG. 2, attention must be paid to the sign of $\theta_d$ which is negative. Thus the difference in direction is given by the combination $\theta_i + \theta_d$. The following expression for $\theta_i + \theta_d$ is obtained from the above expression and the equation for $n_d$ where the diffracted beam has been assumed to be extraordinarily polarized, resulting in the expression:

$$\sin(\theta_i + \theta_d) = \frac{n_o^2 - n_e^2}{n_e^2} \frac{\sin^2\theta\cos^2\theta_i}{\sin(\theta_i - \theta_d)}.$$

The difference in direction of propagation of the incident and diffracted beams given by this equation is preferably compensated in the present invention to generate collinear exit beams by utilizing properties of internal reflection and refraction in uniaxial crystals. For internal reflection, the matching of wave vector components at the reflecting interface requires that $$n'_i\sin\theta'_i = n''_i\sin\theta''_i; n'_d\sin\theta'_d = n''_d\sin\theta''_d$$

where $\theta'_i$, $\theta'_d$, $\theta''_i$, and $\theta''_d$ are the respective internal angles of incidence and reflection at a reflecting face of the Bragg cell. The application of Snell's Law for refraction at the exit face of the Bragg cell requires that $$n_i \sin\theta'''_i = n_d \sin\theta'''_d$$

where $\theta'''_i$ and $\theta'''_d$ are the internal angles of incidence at the exit face of the Bragg cell for the incident and diffracted beams, respectively.

Figure 3:
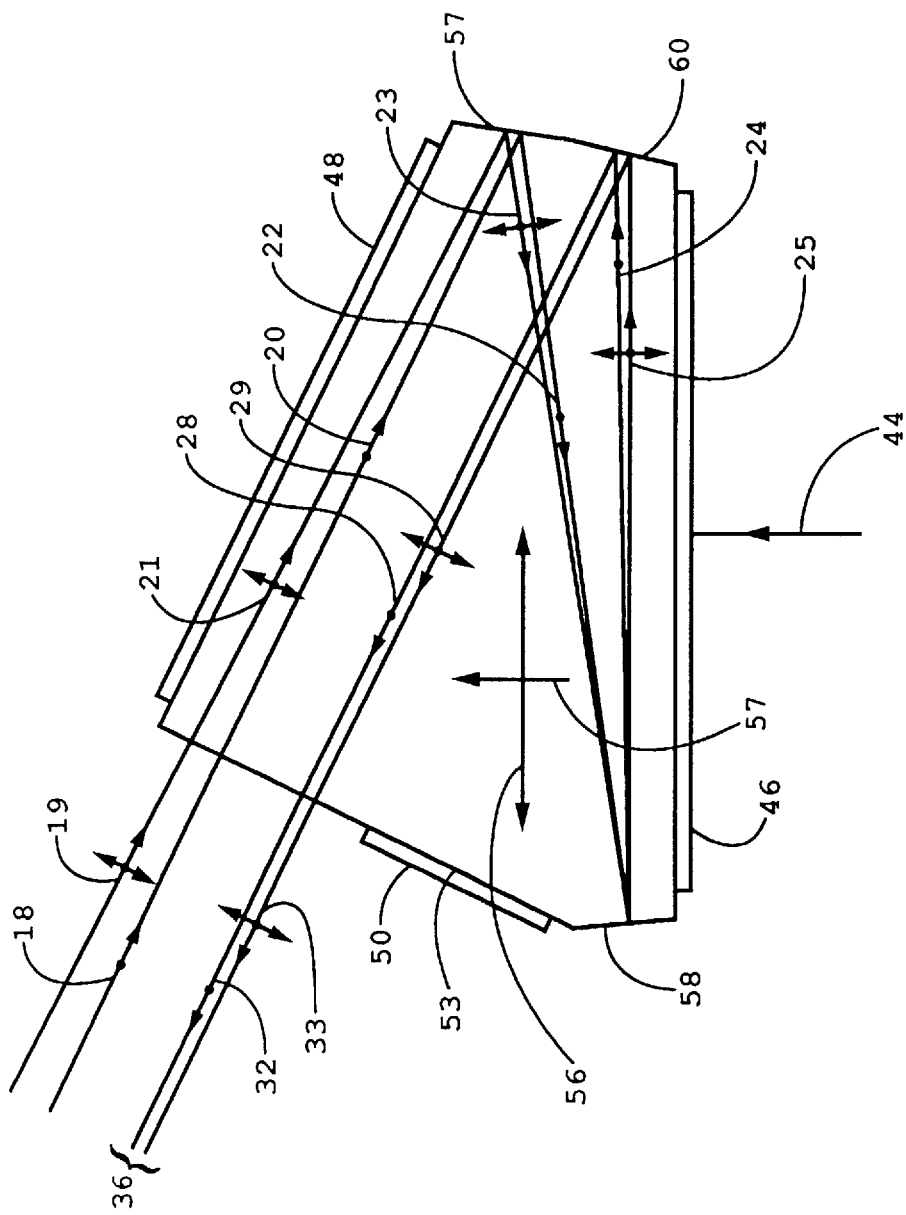

FIG. 3 depicts in schematic form the detailed propagation of the input beams (18) and (19) through the acousto-optical Bragg cell (53) configured for use in the first and second embodiments such that the nominal angle between the input beams (18) and (19) and the output beam (36) is an angle specified by the design of the Bragg cell to be a value equal to approximately 180 degrees and independent of small changes in the orientation of the Bragg cell in the plane of FIG. 3 relative to the direction of the input beams (18) and (19).

Figure 4:
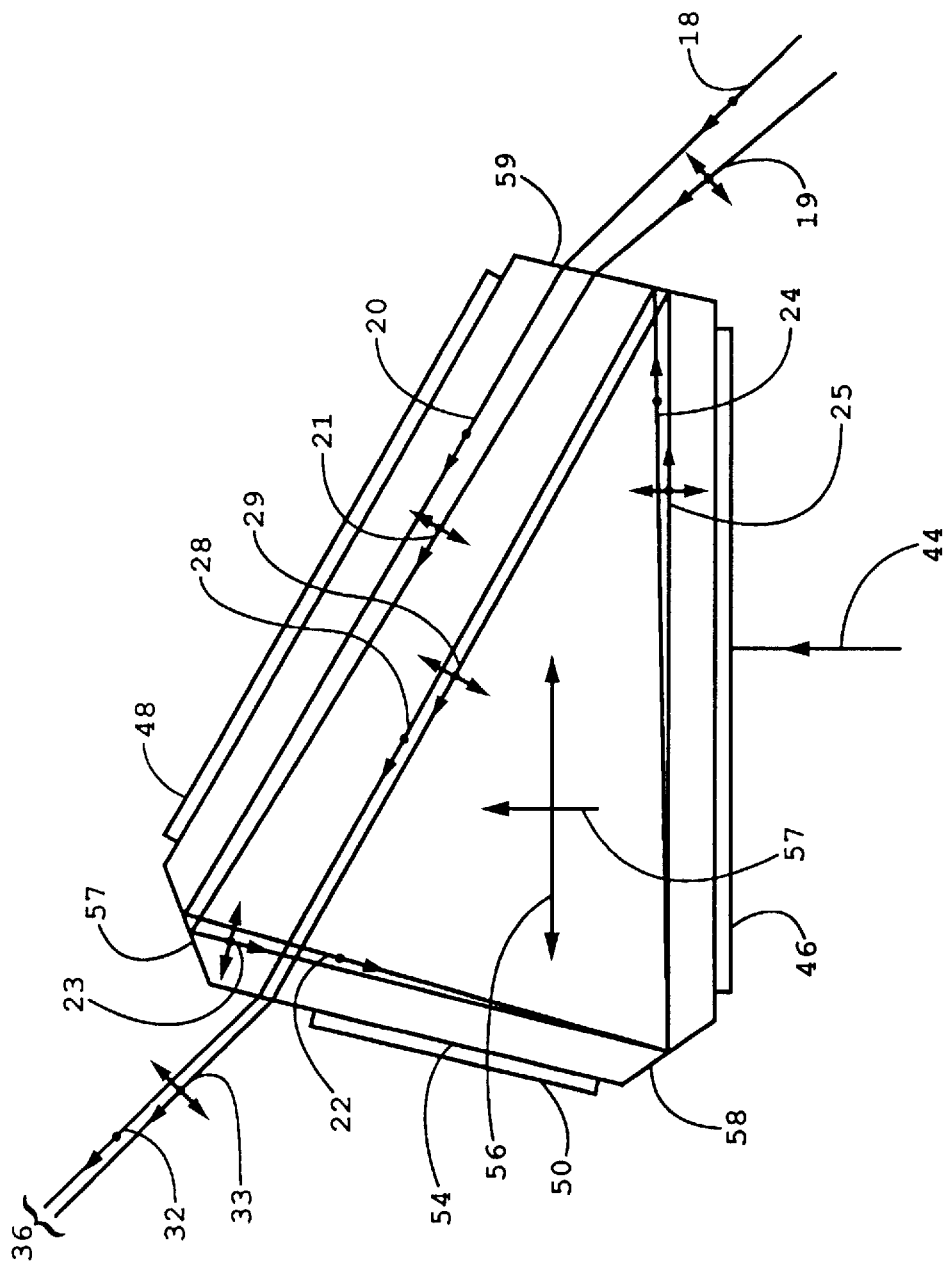

FIG. 4 depicts in schematic form the detailed propagation of the input beams (18) and (19) through the acousto-optical Bragg cell (54) configured for use in the first and second embodiments such that the nominal angle between the input beams (18) and (19) and the output beam (36) is an angle specified by the design of the Bragg cell to be a value equal to approximately 360 degrees and independent of small changes in the orientation of the Bragg cell in the plane of FIG. 4 relative to the direction of the input beams (18) and (19).

Figure 5:
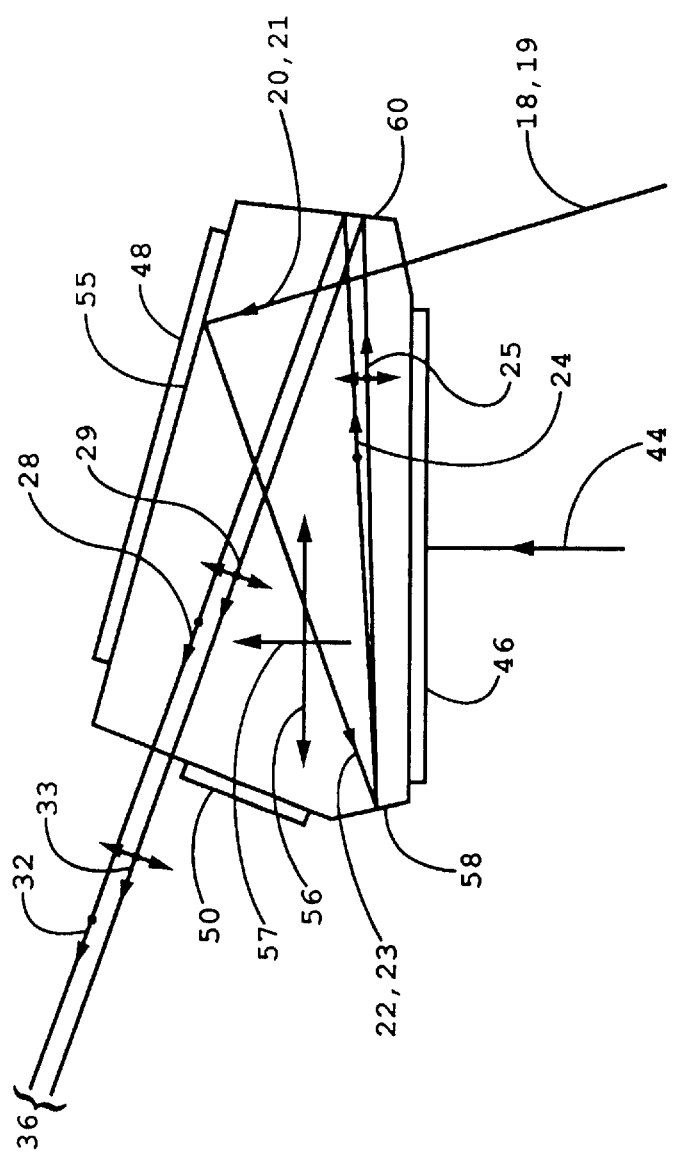
FIG. 5 depicts in schematic form the detailed propagation of the light beams through the acousto-optical Bragg cell configured for use in a presently preferred third embodiment of the present invention such that the angle between the input beam (18) and the output beam (36) is an angle specified by the design of the Bragg cell to be a value approximately equal to 130 degrees.

FIG. 5 depicts in schematic form the detailed propagation of the input beams (18) and (19) through the acousto-optical Bragg cell (55) configured for use in the third embodiment such that the input beams (18) and (19) are collinear, the exit beams (32) and (33) are collinear, and the nominal angle between the input beams (18) and (19) and the output beam (36) is an angle specified by the design of the Bragg cell to be a value approximately equal to 130 degrees. The difference in direction of propagation of the incident and diffracted beams given by the equation for $\sin(\theta_i + \theta_d)$ is compensated for. In the present instant invention, the generation of collinear input beams is achieved by utilizing properties of internal reflection and refraction in uniaxial crystals represented by equations relating $n'_i \sin\theta'_i$ to $n''_i \sin\theta'_i$, $n'_d \sin\theta'_d$ to $n''_d \sin\theta''_d$ and $n_i \sin\theta'''_i$ to $n_d \sin\theta'''_d$.

While the invention has been described with reference to particular embodiments thereof, those skilled in the art will be able to make the various modifications to the described embodiments of the invention without departing from the true spirit and scope of the present invention. It is intended that all combinations of elements and steps which perform substantially the same function in substantially the same way to achieve the same result are with the scope of the present invention.

What is claimed is:

1. An electro-optical apparatus for transforming a single frequency linearly polarized laser beam into a beam having a pair of collinear orthogonally polarized components each having a different frequency, said apparatus comprising:

means for providing said single frequency linearly polarized beam as a first external input beam to said apparatus;

means for providing an electrical signal of frequency $f_0$;

acousto-optical means operatively connected to said electrical signal providing means for transforming said electrical signal into an acoustic beam within said acousto-optical means, said acoustic beam having a direction of propagation, said acousto-optical means being disposed for receiving said first external input beam within said acousto-optical means as a first internal input beam, said first internal input beam being ordinarily polarized, said acousto-optical means further comprising means for transforming said first internal input beam into a first intermediate beam, said first intermediate beam being ordinarily polarized and having a direction of propagation nominally normal to said direction of propagation of said acoustic beam in the region of said acoustic beam, said acousto-optical means still further comprising means for transforming said first intermediate beam into second and third intermediate beams during passage through said region of said acoustic beam, said second intermediate beam having a direction of propagation, frequency, and polarization which is substantially the same as that of said first intermediate beam, said third intermediate beam being extraordinarily polarized, said second and third intermediate beams having a frequency difference equivalent to said electrical signal frequency $f_0$ and having a relatively small difference in direction of propagation, said acousto-optical means further comprising means for causing said second and third intermediate beams to exit the acousto-optical means as first and second exit beams, said first and second exit beams having the same direction of propagation and orthogonal polarizations, with a difference in frequency equivalent to said electrical signal frequency $f_0$ and having a small relative displacement with respect to each other, said first exit beam having the same polarization and frequency as said second intermediate beam, said second intermediate beam having the same polarization and frequency as said first external input beam, said second exit beam having the same polarization and frequency as said third intermediate beam, said first and second exit beams and said first external input beam each having an associated intensity, the sum of said intensities of said first and second exit beams being nominally the same as said intensity of said first external input beam; and means for adjusting said intensity of said first exit beam relative to said intensity of said first external input beam; whereby said single frequency, linearly polarized laser beam is transformed into said beam having said pair of collinear orthogonally polarized components with a high diffraction efficiency.

2. An apparatus in accordance with claim 1 wherein said intensity adjusting means comprises means for adjusting said intensity of said first exit beam relative to said intensity of said first external input beam between nominal values of 0% to 100%.

3. An apparatus in accordance with claim 1 wherein said means for providing said electrical signal comprises a frequency stabilized electronic oscillator.

4. An apparatus in accordance with claim 1 wherein said acousto-optical means comprises a piezoelectric transducer means bonded to a uniaxial crystal means.

5. An apparatus in accordance with claim 4 wherein said means for transforming said electrical signal into an acoustic beam comprises means for transforming said electrical signal into an acoustic shear wave.

6. An apparatus in accordance with claim 5 wherein said acousto-optical means further comprises acoustic absorbing material affixed to said uniaxial crystal means.

7. An apparatus in accordance with claim 6 wherein said acousto-optical means further comprises a first anti-reflecting surface for transmitting said first external input beam into the interior of said uniaxial crystal as said first internal input beam.

8. An apparatus in accordance with claim 7 wherein said acousto-optical means further comprises first optical reflection surface means affixed to said uniaxial crystal means for transforming said first internal input beam into said first intermediate beam.

9. An apparatus in accordance with claim 8 wherein said means for transforming said first intermediate beam into said second and third intermediate beams comprises photoelastic interaction means.

10. An apparatus in accordance with claim 9 wherein said means for transforming said first intermediate beam into said second and third intermediate beams comprises means for transforming said first intermediate beam during a single pass thereof through said region of said acoustic beam.

11. An apparatus in accordance with claim 10 wherein said acousto-optical means further comprises second optical reflecting surface means and second anti-reflecting surface means affixed to said uniaxial crystal means.

12. An apparatus in accordance with claim 11 wherein said acousto-optical means further comprises means for causing said second and third intermediate beams to exit said acousto-optical means as said first and second exit beams.

13. An apparatus in accordance with claim 12 wherein said relative intensity adjusting means comprises means for adjusting said intensity of said first exit beam relative to the intensity of said first external input beam between nominal values of 0% and 100%.

14. An apparatus in accordance with claim 4 wherein said acousto-optical means further comprises a first anti-reflecting surface for transmitting said first external input beam into the interior of said uniaxial crystal as said first internal input beam.

15. An apparatus in accordance with claim 14 wherein said acousto-optical means further comprises first optical reflection surface means affixed to said uniaxial crystal means for transforming said first internal input beam into said first intermediate beam.

16. An apparatus in accordance with claim 4 wherein said acousto-optical means further comprises first optical reflection surface means affixed to said uniaxial crystal means for transforming said first internal input beam into said first intermediate beam.

17. An apparatus in accordance with claim 1 wherein said means for transforming said electrical signal into an acoustic beam comprises means for transforming said electrical signal into an acoustic shear wave.

18. An apparatus in accordance with claim 1 wherein said means for transforming said first intermediate beam into said second and third intermediate beams comprises photoelastic interaction means.

19. An apparatus in accordance with claim 1 wherein said means for transforming said first intermediate beam into said second and third intermediate beams comprises means for transforming said first intermediate beam during a single pass thereof through said region of said acoustic beam.

20. An apparatus in accordance with claim 19 wherein said means for transforming said first intermediate beam into said second and third intermediate beams comprises photoelastic interaction means.

21. An apparatus in accordance with claim 1 further comprising means for rotating the polarization of said linearly polarized input beam for generating a second external input beam having a polarization orthogonal to the polarization of the first external input beam, said acousto-optical means being further disposed for receiving said second external input beam within said acousto-optical means as a second internal input beam, said second internal input beam being extraordinarily polarized.

22. An apparatus in accordance with claim 21 wherein said acousto-optical means further comprises means for transforming said second internal input beam into a fourth intermediate beam, said fourth intermediate beam being extraordinarily polarized and having a direction of propagation nominally normal to the direction of propagation of said acoustic beam in the region of said acoustic beam and substantially parallel to the direction of said third intermediate beam.

23. An apparatus in accordance with claim 22 wherein said acousto-optical means further comprises means for transforming said fourth intermediate beam into fifth and sixth intermediate beams during passage through said region of said acoustic beam, said fifth intermediate beam having a direction of propagation, frequency, and polarization which is the same as that of said fourth intermediate beam, said sixth intermediate beam being orthogonally polarized to said fifth intermediate beam and having a direction of propagation and polarization which is the same as said second intermediate beam, said fifth and sixth intermediate beams having a frequency difference corresponding to said $f_0$ and a relatively small difference in the direction of propagation.

24. An apparatus in accordance with claim 23 wherein said acousto-optical means further comprises means for causing said fifth and sixth intermediate beams to exit said acousto-optical means as third and fourth exit beams, said third and fourth exit beams having the same direction of propagation and the same relative displacement as said first and second exit beams.

25. An apparatus in accordance with claim 24 wherein said third exit beam has the same polarization as said second exit beam, said fourth exit beam having the same polarization as said first exit beam, said third and fourth exit beams having said frequency difference $f_0$, said first and third exit beams having the same frequency, said second and fourth exit beams having a frequency difference $2f_0$.

26. An apparatus in accordance with claim 25 wherein said third and fourth exit beams and said second external input beam have associated intensities, the sum of the intensities of the third and fourth exit beams being nominally the same as the intensity of the second external input beam.

27. An apparatus in accordance with claim 26 wherein said intensity adjusting means further comprises means for adjusting the relative intensity of said third exit beam relative to the intensity of said second external input beam.

28. An apparatus in accordance with claim 27 wherein said relative intensity adjusting means comprises means for adjusting said intensity of said third exit beam relative to the intensity of said second external input beam between nominal values of 0% and 100%.

29. An apparatus in accordance with claim 21 wherein said polarization rotating means comprises means for rotating the polarization of said linearly polarized input beam for generating a third external input beam, said third external input beam having a polarization comprising a combination of the polarizations of said first and second external input beams, said acousto-optical means transforming means comprising means for transforming said third external input beam into said first and fourth intermediate beams, said acousto-optical means comprising photoelastic interaction means for transforming said first and fourth intermediate beams into second, third, fifth, and sixth intermediate beams during passage through the region of the acoustic beam.

30. An apparatus in accordance with claim 29 wherein said acousto-optical means comprises means for causing the second, third, fifth, and sixth intermediate beams to exit said acousto-optical means as first, second, third, and fourth exit beams, respectively, said exit beams having the same direction of propagation, the first and second exit beams having the same relative displacement as the third and fourth exit beams, the third exit beam having the same polarization as the second exit beam, the fourth exit beam having the same polarization as the first exit beam, the third and fourth exit beams having a frequency difference $f_0$, the first and third exit beams having the same frequency, the second and fourth exit beams having a frequency difference $2f_0$.

31. An apparatus in accordance with claim 30 wherein said exit beams and said third external input beam have associated intensities, the sum of the intensities of said exit beams being nominally the same as the intensity of said external input beam, the ratio of the intensity of the first exit beam to the intensity of the second exit beam being the same as ratio of the intensity of the third exit beam to the intensity of the fourth exit beam.

32. An apparatus in accordance with claim 31 wherein said intensity adjusting means comprises means for adjusting the sum of the intensities of the first and third exit beams relative to the sum of the intensities of the second and fourth exit beams.

33. An apparatus in accordance with claim 32 wherein said intensity sum adjusting means further comprises means for adjusting the sum of said intensities of the first and third exit beams with respect to the sum of the said intensities of the first, second, third, and fourth exit beams between nominal values of 0% and 100%.

\* \* \* \* \*